2,927,917

METALLISABLE POLYAZO DYESTUFFS AND THE COMPLEX COPPER COMPOUNDS THEREOF

Rudolf Durig, Basel, and Werner Bossard, Riehen, near Basel, Switzerland, assignors to J. R. Geigy A.-G., Basel, Switzerland, a Swiss firm No Drawing. Application June 17, 1957
Serial No. 666,239

Claims priority, application Switzerland August 2, 1956

7 Claims. (Cl. 260—148)

The present invention concerns metallisable polyazo dyestuffs and the complex copper compounds thereof, as well as the production of these dyestuffs. It also concerns the use thereof for the fast dyeing of cellulosic material in pure blue shades.

It has been found that valuable blue polyazo dyestuffs are obtained if tetrazotised 4.4'-diaminodiphenyl compounds which, in the ortho-position to the diazonium groups, contain substituents which are capable of forming the metal complex or groups which can be converted into such, are coupled with two molecules of hydroxynaphthalene sulphonic acids which can be further substituted, of which at least one molecule is a 1-amino-8-hydroxynaphthalene-6-sulphonic acid substituted at the amino group, and the dyestuffs obtained are treated either in substance or on the fibre with agents giving off copper.

In the metal-free condition, the new polyazo dyestuffs correspond to the general formula:

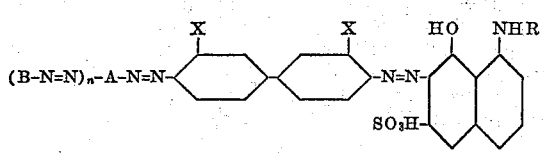

wherein

A represents the radical of a hydroxynaphthalene sulphonic acid bound to the azo linkage in o-position to the hydroxyl group,
B represents a mononuclear radical of the benzene series,
X represents a metallisable group,
R represents a member selected from the group consisting of lower alkyl mononuclear aryl and acyl radicals,
n represents the numerals 0 and 1.

The copper complex compounds of the formula:

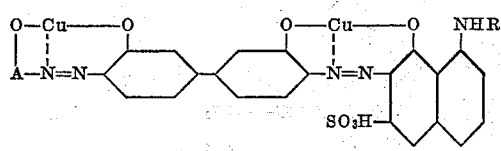

wherein A and R have the meanings given above, are particularly valuable.

Examples of 4.4'-diaminodiphenyl compounds containing substituents in the ortho-position to the amino groups which are capable of forming the metal complex are 4.4'-diaminodiphenyl-3.3'-dicarboxylic acid and 4.4'-diamino-3.3-'dihydroxydiphenyl. Etherified derivatives of the latter with possibly substituted lower alkyl groups can also be used as such in the process according to the present invention, e.g. 4.4'-diamino-3.3'-dicarboxymethoxydiphenyl and, with particular advantage, 4.4'-diamino-3.3'-dimethoxydiphenyl.

Of the hydroxynaphthalene sulphonic acids coupling in the ortho-position to a hydroxyl group which may possibly be substituted, which are used in the present process as azo components, at least 1 mol of a 1-amino-8-hydroxynaphthalene-6-sulphonic acid substituted at the amino group should be used to one mol of tetrazonium compound. Such derivatives are chiefly 1-alkyl-, dialkyl-, aryl- and acyl-amino-8-hydroxynaphthalene-6-sulphonic acids. Some of these compounds are known, others can be produced by known processes from starting materials which are already known, in the present process the 1-acylamino-8-hydroxynaphthalene-6-sulphonic acids are of chief importance as azo components. Examples of acyl groups are the acetyl, chloracetyl, methoxy acetyl, phenoxy acetyl groups, benzoyl, as well as chlorinated and alkylated benzoyl groups and finally carbomethoxy and carboethoxy groups.

If, in the present process in the formation of unsymmetrical dyestuffs, only 1 mol of the 1-amino-8-hydroxynaphthalene-6-sulphonic acid above mentioned is used per mol of tetrazonium compound, then one mol of an unsubstituted hydroxynaphthalene mono-, di- or tri-sulphonic acid or one mole of another aminohydroxynaphthalene sulphonic acid which may possibly be further substituted, is used as second component. A condition of the present process is that in this second azo component, the o-position to the hydroxyl group must be free also and capable of being coupled. Examples of unsubstituted hydroxynaphthalene sulphonic acids are 1-hydroxynaphthalene-3- or -4-sulphonic acid, 2-hydroxynaphthalene-6-sulphonic acid, 1-hydroxynaphthalene-3.6-, -3.8- and -4.8-disulphonic acids, 2-hydroxynaphthalene-3.6- and -6.8-disulphonic acids and 1-hydroxynaphthalene-3,6,8-trisulphonic acid and examples of substituted hydroxynaphthalene sulphonic acids are 1.8-dihydroxynaphthalene 3.6-disulphonic acid and 1-hydroxy-8-ethoxy- or -8-chloronaphthalene-3.6-disulphonic acid. Both amino hydroxynaphthalene sulphonic acids themselves as well as the alkyl, cycloalkyl, aralkyl, aryl and acyl derivatives thereof substituted at the amino groups are used as aminated derivatives, e.g. N-acetyl, N-benzoyl and N-phenyl derivatives of 1-amino-8-hydroxynaphthalene-3.6- and 4.6-disulphonic acid, of 1- or 2-amino-5-hydroxynaphthalene-7-sulphonic acid, of 2-amino-6-hydroxynaphthalene-8-sulphonic acid and of 2-amino-8-hydroxynaphthalene-6-sulphonic acid. In addition amino-hydroxynaphthalene sulphonic acids containing aryl azo groups can be named, such as are obtained for example by acid coupling of diazonium compounds of the benzene series with such amino hydroxynaphthalene sulphonic acids, the ortho-positions to the amino and hydroxy groups of which are both free and capable of being coupled. These components containing azo groups are particularly suitable for the production of polyazo dyestuffs which dye cellulose material in navy blue shades.

Of the azo dyestuffs which can be produced according to the process according to the present invention, those which contain 1 mol of a 1-hydroxynaphthalene sulphonic acid, examples of which have been given above, and 1 mol of a 1-acylamino-8-hydroxynaphthalene-6-sulphonic acid to 1 mol of tetrazonium compound are particularly distinguished by their very good fastness properties. Of particular technical value are the complex copper compounds from diazotised 4.4'-diamino-3.3'-dimethoxydiphenyl coupled with 1 mol of a 1-hydroxynaphthalene sulphonic acid and 1 mol of a 1-acylamino-8-hydroxynaphthalene-6-sulphonic acid, dyestuffs having a total of three sulphonic acid groups being preferred because of their solubility.

The tetrazonium compounds are coupled with the hydroxynaphthalene and amino hydroxynaphthalene sulphonic acids usable according to the present invention in any order desired and by methods known per se.

In the form of their alkali and ammonium salts, the new polyazo dyestuffs are dark powders which dissolve in water with a blue colour and dye cellulose fibres from liquors containing Glaubers salt in blue shades. The dyeings are fixed fast to light and wet by after treatment with agents giving off copper. Of particular interest are the complex copper compounds which can be produced by known methods from the metal-free polyazo dyestuffs according to the present invention. They dye cellulose material such as cotton and regenerated cellulose fibres in very pure, reddish to greenish blue shades which have remarkable fastness properties, in particular very good fastness to acids. No undesirable change in the shade and practically no injurious effect on the light fastness of the dyeings is noticeable on subjecting the cellulose dyeings later to anti-crease processing. The complex copper compounds, in particular those which have already been mentioned as valuable groups, have a strong affinity to cellulose fibres. At the same time, in comparison with already known, similar polyazo dyestuffs, they have however, very good levelling power.

The following examples serve to illustrate the invention without limiting it in any way. In these examples, the temperatures are given in degrees centigrade and, where not otherwise stated, parts are given as parts by weight.

24.4 parts of 4.4'-diamino-3.3'-dimethoxydiphenyl are tetrazotised in the usual way and poured at 0–5° into a solution of 30.4 parts of 1-hydroxynaphthalene-3.8-disulphonic acid and 35 parts of sodium carbonate in 1000 parts of water. The diazo-monoazo dyestuff precipitates completely after a short time and no more tetrazonium compound can be traced. A soda alkaline solution of 28.1 parts of 1-acetylamino-8-hydroxynaphthalene-6-sulphonic acid is then added and the whole is stirred until the coupling is complete. The disazo dyestuff obtained in this way is precipitated with sodium chloride, filtered off and again dissolved in 2500 parts of water at 80–85°. 400 parts of a copper oxide/ammonia solution which contains 50 parts of crystallised copper sulphate and 120 parts of concentrated aqueous ammonia, are then added and the whole is stirred at this temperature for 4–5 hours. After the addition of a further 50 parts of concentrated ammonia solution the temperature is raised to 90–95° for 15–20 hours. The copper complex formed is precipitated with sodium chloride, filtered off and dried. It is a dark powder which dissolves in water with a blue colour and draws onto cotton, linen and regenerated cellulose fibres excellently from an aqueous bath. The dyeings have very good fastness to light and also the shade and fastness to light are barely influenced by anti-crease processing.

In the following table further dyestuffs are given which are obtained in a similar manner by coupling tetrazotised 4.4'-diamino-3.3'-dimethoxydiphenyl with the azo components in columns 1 and 3 and converting into the copper complexes.

*Example 1*

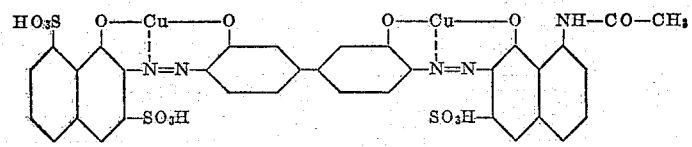

| No. | Component A | Tetrazo compound | Component B | Shade of copper-containing dyeing |
|---|---|---|---|---|
| 1 | HO₃S, OH, SO₃H (naphthalene) | OCH₃, OCH₃, NH₂—⟨⟩—⟨⟩—NH₂ | HO, NHCO—⟨⟩, SO₃H (naphthalene) | Blue. |
| 2 | HO₃S, OH, SO₃H (naphthalene) | OCH₃, OCH₃, NH₂—⟨⟩—⟨⟩—NH₂ | HO, NHCOOCH₃, SO₃H (naphthalene) | Do. |
| 3 | HO₃S, OH, SO₃H (naphthalene) | OCH₃, OCH₃, NH₂—⟨⟩—⟨⟩—NH₂ | HO, NHCOO—CH₂—CH₂—C₂H₅—O, HO₃S (naphthalene) | Do. |
| 4 | HO₃S, OH, SO₃H (naphthalene) | OCH₃, OCH₃, NH₂—⟨⟩—⟨⟩—NH₂ | HO, NHCOCH=C(CH₃)₂, HO₃S (naphthalene) | Do. |

| No. | Component A | Tetrazo compound | Component B | Shade of copper-containing dyeing |
|---|---|---|---|---|
| 5 | HO₃S, OH, SO₃H (naphthalene) | OCH₃, OCH₃, NH₂, NH₂ (biphenyl) | HO, NHCO-⟨⟩, HO₃S (naphthalene) | Blue. |
| 6 | HO, OH, HO₃S, SO₃H | OCH₃, OCH₃, NH₂, NH₂ | HO, NHCOCH₃, HO₃S | Greenish blue. |
| 7 | H₅C₂O, OH, HO₃S, SO₃H | OCH₃, OCH₃, NH₂, NH₂ | HO, NHCOCH₃, HO₃S | Do. |
| 8 | H₅C₂O, OH, HO₃S, SO₃H | OCH₃, OCH₃, NH₂, NH₂ | HO, NHCO-⟨⟩, HO₃S | Do. |
| 9 | SO₃H, OH, SO₃H | OCH₃, OCH₃, NH₂, NH₂ | HO, NHCOCH₃, HO₃S | Reddish blue. |
| 10 | SO₃H, OH, SO₃H | OCH₃, OCH₃, NH₂, NH₂ | HO, NHCO-⟨⟩, HO₃S | Do. |
| 11 | HO₃S, OH, SO₃H | OCH₃, OCH₃, NH₂, NH₂ | HO, NHCOCH₂Cl, HO₃S | Blue. |
| 12 | HO₃S, OH, SO₃H | OCH₃, OCH₃, NH₂, NH₂ | HO, NHCOCH₂CH₃, HO₃S | Do. |
| 13 | HO₃S, OH, SO₃H | OCH₃, OCH₃, H₂N, NH₂ | HO, NH-CO-⟨⟩-CH₃, HO₃S | Do. |
| 14 | HO₃S, OH, SO₃H | OCH₃, OCH₃, H₂N, NH₂ | HO, NH-CO-⟨⟩-Cl, HO₃S | Do. |

*Example 2*

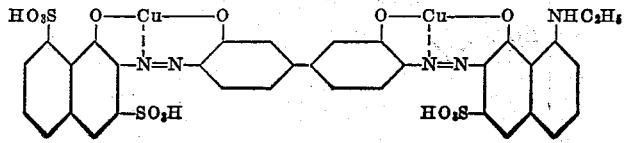

A soda alkaline solution of 26.7 parts of 1-ethylamino-8-hydroxynaphthalene-6-sulphonic acid is poured into the diazo-azo compound of 24.4 parts of tetrazotised 4.4'-diamino-3.3'-dimethoxydiphenyl and 30.4 parts of 1-hydroxynaphthalene-3.8-disulphonic acid, and the whole is stirred until the coupling is complete. The dyestuff is converted into the copper complex as described in Example 1. The copper-containing dyestuff dyes cotton and staple fibre in strong blue shades which have very good fastness to light.

Some dyestuffs are given in the following table which are obtained in a similar manner. Their dyeings on cellulose material have also very good fastness properties.

| No. | Component A | Tetrazo compound | Component B | Shade of copper containing dyeing |
|---|---|---|---|---|
| 1 | 1-hydroxy-naphthalene with $HO_3S$, $OH$, $SO_3H$ | $NH_2$–Ar($OCH_3$)–Ar($OCH_3$)–$NH_2$ | naphthalene with $HO$, $NHC_2H_4OH$, $HO_3S$ | Blue. |
| 2 | 1-hydroxy-naphthalene with $HO_3S$, $OH$, $SO_3H$ | $NH_2$–Ar($OCH_3$)–Ar($OCH_3$)–$NH_2$ | naphthalene with $HO$, $NH$–phenyl, $HO_3S$ | Do. |
| 3 | 1-hydroxy-naphthalene with $HO_3S$, $OH$, $SO_3H$ | $NH_2$–Ar($OCH_3$)–Ar($OCH_3$)–$NH_2$ | naphthalene with $HO$, $NH$–phenyl–$OCH_3$, $HO_3S$ | Do. |
| 4 | naphthalene with $HO$, $OH$, $HO_3S$, $SO_3H$ | $NH_2$–Ar($OCH_3$)–Ar($OCH_3$)–$NH_2$ | naphthalene with $HO$, $NHC_2H_5$, $HO_3S$ | Do. |
| 5 | naphthalene with $HO$, $OH$, $HO_3S$, $SO_3H$ | $NH_2$–Ar($OCH_3$)–Ar($OCH_3$)–$NH_2$ | naphthalene with $HO$, $NH$–phenyl, $HO_3S$ | Do. |
| 6 | naphthalene with $H_5C_2O$, $OH$, $HO_3S$, $SO_3H$ | $NH_2$–Ar($OCH_3$)–Ar($OCH_3$)–$NH_2$ | naphthalene with $HO$, $NHC_2H_5$, $HO_3S$ | Do. |
| 7 | naphthalene with $Cl$, $OH$, $HO_3S$, $SO_3H$ | $NH_2$–Ar($OCH_3$)–Ar($OCH_3$)–$NH_2$ | naphthalene with $HO$, $NHC_2H_5$, $HO_3S$ | Do. |
| 8 | naphthalene with $HO_3S$, $OH$, $SO_3H$ | $H_2N$–Ar($OCH_3$)–Ar($OCH_3$)–$NH_2$ | naphthalene with $HO$, $NHCH_3$, $HO_3S$ | Do. |
| 9 | naphthalene with $HO_3S$, $OH$, $SO_3H$ | $H_2N$–Ar($OCH_3$)–Ar($OCH_3$)–$NH_2$ | naphthalene with $HO$, $NHCH_3$, $HO_3S$ | Do. |
| 10 | naphthalene with $HO_3S$, $OH$, $SO_3H$ | $H_2N$–Ar($OCH_3$)–Ar($OCH_3$)–$NH_2$ | naphthalene with $HO$, $NH$–$C_2H_4OH$, $HO_3S$ | Do. |

| No. | Component A | Tetrazo compound | Component B | Shade of copper containing dyeing |
|---|---|---|---|---|
| 11 | HO₃S—[naphthalene]—OH, SO₃H | H₂N—[C₆H₃(OCH₃)]—[C₆H₃(OCH₃)]—NH₂ | HO—[naphthalene(SO₃H)]—NH—[C₆H₄]—OCH₃ | Blue. |

Example 3

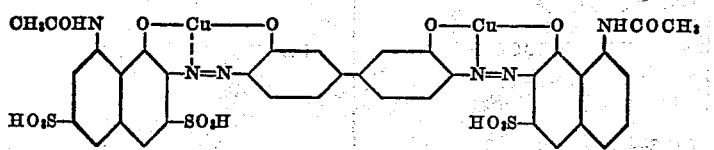

A soda alkaline solution of 28.1 parts of 1-acetylamino-8-hydroxynaphthalene-6-sulphonic acid is poured into the diazonium compound from 24.4 parts of tetrazotised 4.4′-diamino-3.3′-dimethoxydiphenyl and 36.1 parts of 1-acetylamino-8-hydroxynaphthalene-3.6-disulphonic acid and the whole is stirred until the coupling is complete. The copper complex compound obtained therefrom by the method described in Example 1 dyes cellulose material direct in vivid blue shades which have very good fastness to light.

Similar dyestuffs are obtained if, in this example, the 1-acetylamino-8-hydroxynaphthalene-3.6-disulphonic acid is replaced by 39.5 parts of 1-phenylamino-8-hydroxynaphthalene-4.6-disulphonic acid or by 39.5 parts of 2-(3′-sulphophenylamino)-5-hydroxynaphthalene-7-sulphonic acid or by 39.5 parts of 2-(3′-sulphophenylamino)-8-hydroxynaphthalene-6-sulphonic acid.

Example 4

OH    OCH₃    OCH₃    HO    NHCOCH₃
   \  /       \  /       \  /       \  /
H₂N—[naphth]—N=N—[C₆H₃]—[C₆H₃]—N=N—[naphth]
    |SO₃H                              HO₃S|
    |
    N=N—[C₆H₄]—COOH 24.4 parts of 4.4′-diamino-3.3′-dimethoxydiphenyl are tetrazotised and poured at 0–5° into a solution of 38.7 parts of the monoazo dyestuff produced in an acid medium from diazotised 2-aminobenzene-1-carboxylic acid and 2-amino-5-hydroxynaphthalene-7-sulphonic acid, and 35 parts of sodium carbonate in 1000 parts of water. As soon as no more tetrazonium compound can be traced, a soda alkaline solution of 28.1 parts of 1-acetylamino-8-hydroxynaphthalene-6-sulphonic acid is added and the whole is stirred until the coupling is complete. The dyestuff is salted out and isolated. The trisazo dyestuff so obtained dyes cotton and staple fibres in navy blue shades, the wet and light fastness properties of which are considerably improved by after-treatment with copper salt solutions.

Similar dyestuffs are obtained if, in the acid coupled monoazo dyestuff, the 2-aminobenzene-1-carboxylic acid is replaced by 2-amino-5-nitrobenzene-1-carboxylic acid or by 5-amino-2-hydroxybenzene-1-carboxylic acid or by aminobenzene, or if 1-benzoylamino-8-hydroxynaphthalene-6-sulphonic acid is used instead of 1-acetylamino-8-hydroxynaphthalene-6-sulphonic acid.

Example 5

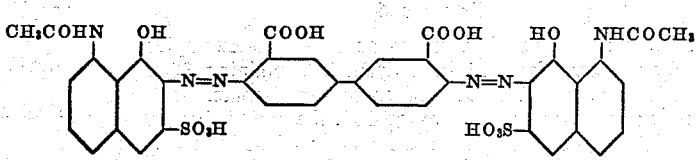

27.2 parts of 4.4′-diaminodiphenyl-3.3′-dicarboxylic acid are tetrazotised in the usual way and poured at 0–5° into a solution of 56.2 parts of 1-acetylamino-8-hydroxynaphthalene-6-sulphonic acid and 70 parts of sodium carbonate in 1800 parts of water. The symmetrical disazo dyestuff precipitates after a short time and can be easily isolated by the addition of a little sodium chloride. It dyes cotton and cellulose material in reddish blue shades the wet and light fastness properties of which can be considerably improved by after coppering.

Further symmetrical dyestuffs are given in the following table which are obtained in a similar manner, the after-coppered cotton dyeings of which also have good fastness properties.

| No. | Tetrazo compound, 1 mol | Azo component, 2 mol | Shade of copper-containing dyeing |
|---|---|---|---|
| 1 | 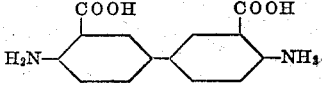 | 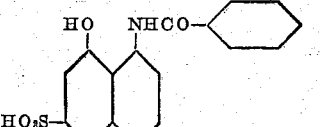 | Reddish blue. |
| 2 |  | 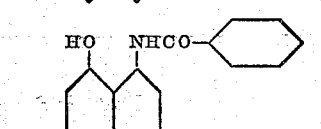 | Greenish blue. |
| 3 |  | 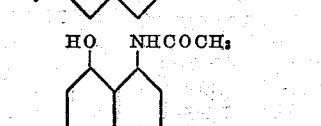 | Do. |
| 4 |  | 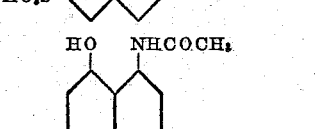 | Blue. |
|   |  | 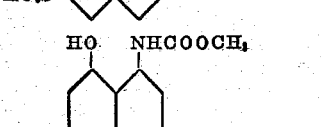 | Do. |

Example 6

2 parts of a dyestuff obtained according to Examples 1, 2 or 3 are dissolved in a dyebath containing 3000 parts of water and 1 part of sodium carbonate. 100 Parts of cotton are entered at 40–50°, the bath is heated within 30 minutes to 90–95°, 30 parts of sodium sulphate are added and dyeing is continued at this temperature for 45 minutes. After this time, the dyed goods are rinsed cold in the usual way and dried. The cotton is dyed in this manner in clear blue shades which have good wet fastness and very good light fastness properties.

If a dyestuff obtained according to Example 4 or 5 is used for the dyeing, then, after rinsing, the dyed cotton is after-treated in a fresh bath for 30 minutes at 70° with 2 parts of copper sulphate and 2 parts of acetic acid. It is then rinsed cold and dried. The wet and light fastness properties of these dyeings are considerably increased in this manner.

What we claim is:

1. A member of the group consisting of a polyazo dyestuff of the general formula:

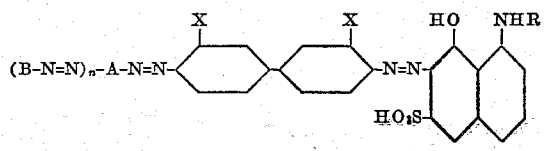

wherein

A represents the radical of a hydroxynaphthalene sulphonic acid bound to the azo linkage in o-position to the hydroxyl group, B represents a mononuclear radical of the benzene series, X represents a metallisable group, R represents a member selected from the group consisting of lower alkyl, mononuclear aryl and acyl radicals, "acyl" being the radical of a lower monocarboxylic acid, $n$ represents the numerals 0 and 1, and the complex copper compound thereof.

2. A cupriferous disazo dyestuff of the general formula:

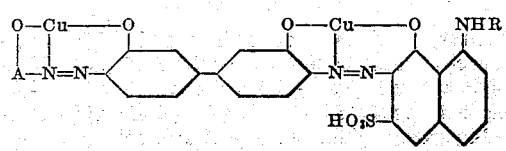

wherein

A represents the radical of a naphthalene sulphonic acid, the group —O—Cu—O— being bound to vicinal positions with respect to the azo group, and R represents a member selected from the group consisting of lower alkyl, mononuclear aryl and acyl radicals, "acyl" being the radical of a lower monocarboxylic acid.

3. A cupriferous disazo dyestuff of the general formula:

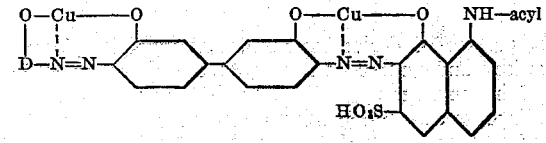

wherein

D represents the radical of a naphthalene disulphonic acid bound to the azo group in 2-position and to the —O—Cu—O— group in 1-position, "acyl" being the radical of a lower monocarboxylic acid, 4. A cupriferous disazo dyestuff of the formula:
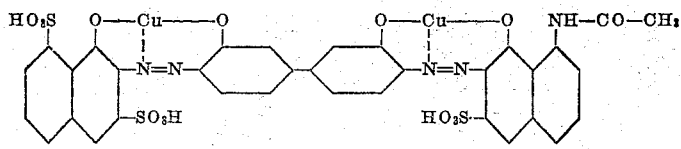
5. A cupriferous disazo dyestuff of the formula:
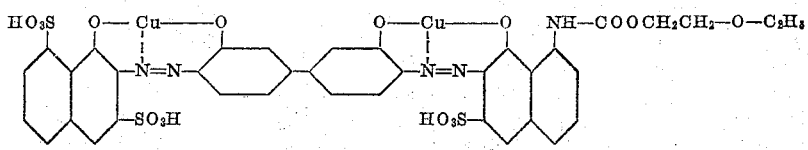
6. A cupriferous disazo dyestuff of the formula:
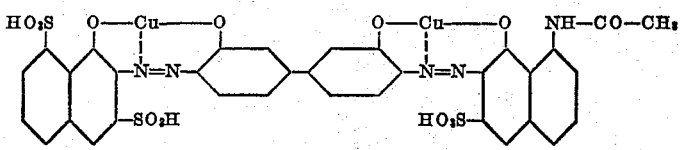
7. A cupriferous disazo dyestuff of the formula:
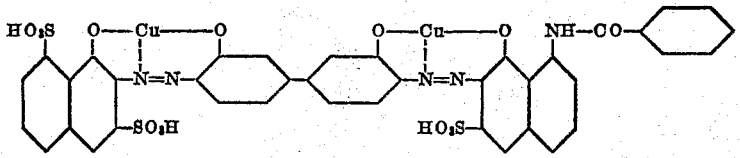
References Cited in the file of this patent
UNITED STATES PATENTS
| | | |
|---|---|---|
| 2,424,066 | Straub et al. | July 15, 1947 |
| 2,553,011 | Schedler et al. | May 15, 1951 |
| 2,620,331 | Wehrli | Dec. 2, 1952 |
| 2,714,588 | Keller | Aug. 2, 1955 |
| 2,813,854 | Iselin et al. | Nov. 19, 1957 |
| 2,820,783 | Riat | Jan. 21, 1958 |